C. P. SCHWARZ.
LEAF SPRING.
APPLICATION FILED MAR. 29, 1917.

1,312,139.

Patented Aug. 5, 1919.

Inventor
Constantine P. Schwarz
By Wilhelm & Parker.
Attorneys.

UNITED STATES PATENT OFFICE.

CONSTANTINE P. SCHWARZ, OF CLEVELAND, OHIO.

LEAF-SPRING.

1,312,139.     Specification of Letters Patent.      Patented Aug. 5, 1919.

Application filed March 29, 1917. Serial No. 158,249.

*To all whom it may concern:*

Be it known that I, CONSTANTINE P. SCHWARZ, a citizen of the United States, residing at Cleveland, in the county of Cuyahoga and State of Ohio, have invented a new and useful Improvement in Leaf-Springs, of which the following is a specification.

This invention relates to leaf springs of the kind comprising a main spring and a counter spring which coöperate to absorb shocks to which the composite spring is subjected.

The objects of the invention are to provide a composite spring of this kind with an insert placed between the main spring and the counter spring to increase the shock absorbing ability of the spring and to prevent noise during the operation of the spring.

In the accompanying drawings:—

It is well known that the shock absorbing ability of a leaf spring varies as the pressure acting on the engaging faces of the spring leaves or relatively movable parts of the spring, as the coefficient of friction acting between the relatively movable parts of the spring, and as the amount of relative movement between engaging faces. To increase the shock absorbing ability of leaf springs, means have been provided for increasing the friction between relatively movable parts of a spring. Means have also been provided for increasing the displacement or relative movement of the parts, for example, by means of the structure shown in my co-pending application No. 76,109, filed February 4th, 1916, and means have also been devised for increasing the pressure acting on the engaging faces of the leaves of the spring by use, for example, of a counter spring. It has been found, however, that the use of a counter spring causes noises which are objectionable, these noises being due to a coming together of the counter spring and main spring after having been separated by a severe shock. For this purpose, an insert of the kind hereinafter described is placed between the main spring and counter spring, which not only increases the relative displacement between these two springs and thereby increases the shock absorbing ability, but also eliminates the noise.

Figure 1:
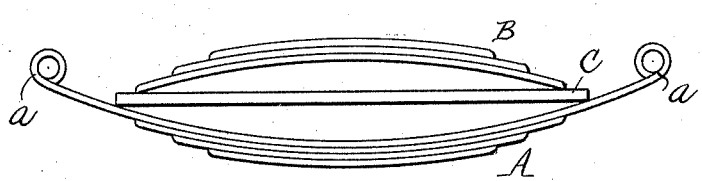
Figure 1 is a side elevation of a spring embodying the invention before the parts of the spring are drawn together.
Figure 2:
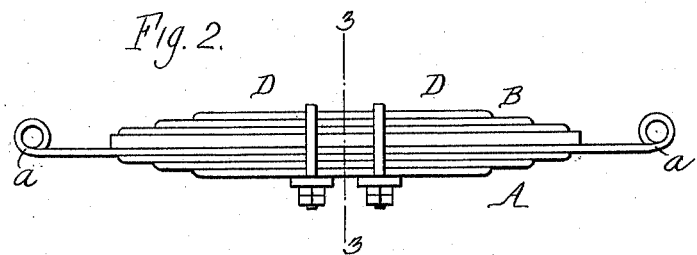
Fig. 2 is a similar view thereof showing the parts of the spring in operative relation to each other.
Figure 3:
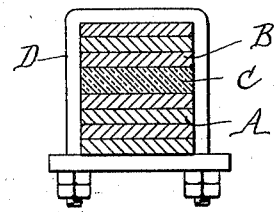
Fig. 3 is a transverse sectional elevation thereof on line 3—3, Fig. 2.

A represents the main spring, which may, as in the construction shown, comprise a plurality of spring leaves and which has the usual looped end portions or eyes $a$ for securing the spring to the shackles or bolts of a vehicle. This spring as well as the counter spring may be of the kind commonly used in which adjacent spring leaves are in contact, or it may be provided with inserts between the spring leaves, as shown in my above mentioned application No. 76,109. B represents the counter spring, which as shown in Fig. 1, normally has a curvature opposite to that of the main spring, and which preferably also consists of a plurality of spring leaves. C represents an insert adapted to be secured between the two parts A and B of the spring. The insert may be made of any suitable material having a yielding or flexible surface so that no noise will be made by the coming in contact of the parts of the spring and the insert after these parts have been separated by a shock. The insert should also be of a material which will not become disintegrated by the flexing or bending of the spring, such as leather, paper, fabric of any kind, fiber, wood, or any other suitable material, and should preferably be of some light substance so as not to materially increase the weight of the composite spring. Since the shock absorbing ability of the composite spring depends upon the thickness of the insert, it is desirable to make the insert as thick as is practicable. The insert should also be of sufficient length and breadth to keep the adjacent faces of the main and counter spring out of contact at all times.

The main and counter springs with the insert in place between the same are then pressed together and securely clamped in place by any suitable means, such as clips or shackles D so that the longest leaf of each spring part touches the insert throughout the length of the insert. When the composite spring is assembled, the counter spring increases the pressure acting on the contacting faces of the main spring leaves and thus increases the ability of this spring to absorb shocks. The insert increases the shock absorbing ability of the composite spring by increasing the displacement or relative movement between the two spring parts, and eliminates the principal objection to springs of this kind as heretofore constructed, namely the noise caused by the coming together of the two parts of the spring.

I claim as my invention:—

1. A composite leaf spring comprising a main spring and a counter spring, said springs being normally of opposite curvature, an insert between said two spring parts, said insert having yielding surfaces which prevent noise when the spring parts contact therewith and being of lower specific gravity than steel, and means for clamping said counter spring and said main spring into engagement with said insert.

2. A composite leaf spring comprising a main spring and a counter spring, said springs being normally of opposite curvature and being placed together with their concave faces adjacent to each other, an insert between said adjacent faces for holding said counter spring out of engagement with said main spring, said insert being of a material having flexible surfaces adjacent to the concave faces of the spring parts to prevent noise when said spring parts contact therewith, and means for securing said counter spring and said main spring into contact with said insert throughout their adjacent faces when said spring is in a normal position.

Witness my hand this 19th day of March, 1917.

CONSTANTINE P. SCHWARZ.

Witnesses:
WM. J. SHANER,
E. P. CHAMBERLIN.